US009324226B2

(12) United States Patent
Cienfuegos

(10) Patent No.: US 9,324,226 B2
(45) Date of Patent: *Apr. 26, 2016

(54) POST DISASTER LIGHTING OPERATION SEQUENCES SYSTEM AND METHOD(S) FOR VISUALLY LOCATING, IDENTIFYING, DISTINGUISHING AND TRACKING DISASTER VICTIMS

(71) Applicant: Juan Enrique Cienfuegos, San Antonio, TX (US)

(72) Inventor: Juan Enrique Cienfuegos, San Antonio, TX (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/189,934

(22) Filed: Feb. 25, 2014

(65) Prior Publication Data

US 2014/0300475 A1 Oct. 9, 2014

Related U.S. Application Data

(60) Provisional application No. 61/794,223, filed on Mar. 15, 2013.

(51) Int. Cl.

| | |
|---|---|
| ***G02B 21/00*** | (2006.01) |
| ***G08B 21/10*** | (2006.01) |
| ***G08B 5/38*** | (2006.01) |
| ***G08B 5/00*** | (2006.01) |

(52) U.S. Cl.

CPC ................ *G08B 21/10* (2013.01); *G08B 5/002* (2013.01); *G08B 5/38* (2013.01)

(58) Field of Classification Search

None

See application file for complete search history.

(56) References Cited

U.S. PATENT DOCUMENTS

| | | | | |
|---|---|---|---|---|
| 5,977,913 | A | 11/1999 | Christ | |
| 6,114,948 | A * | 9/2000 | Astell | G08B 5/36 340/286.05 |
| 6,558,082 | B1 | 5/2003 | Carmichael | |
| 7,023,004 | B2 | 4/2006 | Ford | |
| 7,315,036 | B2 | 1/2008 | Ford | |
| 7,510,527 | B1 | 3/2009 | Cienfuegos | |
| 7,637,226 | B1 | 12/2009 | Bradley | |
| 7,674,227 | B1 | 3/2010 | Cienfuegos | |
| 7,839,290 | B2 | 11/2010 | Chidakel | |
| 7,859,418 | B2 | 12/2010 | Greene | |
| 2005/0087702 | A1 * | 4/2005 | Ford | F21L 4/02 250/504 R |

* cited by examiner

*Primary Examiner* — Travis Hunnings

(57) ABSTRACT

Method of implementing a disaster identification system by utilizing personal illuminated displays to visually communicate with search and rescue personnel. The method consists of holding or attaching an illuminated display to people and pets that are located in a disaster stricken area. In one exemplary method, the illuminated displays are set by the users to certain colors and flash patterns to indicate their location, group make up and condition to search and rescue personnel patrolling the area. The night is now utilized to discover survivor's locations and conditions, something that is not done today.

20 Claims, 3 Drawing Sheets

POST DISASTER LIGHTING OPERATION SEQUENCES SYSTEM AND METHOD(S) FOR VISUALLY LOCATING, IDENTIFYING, DISTINGUISHING AND TRACKING DISASTER VICTIMS

This application is a continuation of provisional patent application No. 61/794,223, filed Mar. 15, 201.

FIELD OF THE INVENTION

This invention relates to a method for identifying the location and condition of people located in a disaster stricken area by utilizing illuminated displays. The illuminated displays are held by or attached to each person found in a disaster stricken area. For example soon after an emergency alert is sounded by local authorities. The idea is to utilize the night to locate people who remained in the disaster affected area by searching for the illuminated displays that are held by, or attached to each person or pet.

BACKGROUND OF INVENTION

The object of the present invention is to provide for a new method of identifying people in a disaster stricken area by utilizing illuminated displays. The illuminated displays are used to convey the location and need of assistance (ex. medical condition) of each user in the aftermath of a natural disaster such as a tsunami, tornado, flood, hurricane etc. . . .

The invention came about after having developed a patented illuminated display system that was originally designed as an illuminated multicolored, multimode triage indicator. One day while thinking up many different uses for the triage indicator it occurred to me that in every disaster I had seen on television one thing remained constant, the images of the people on rooftops, car tops and trees. I started thinking how hard they were working for one common goal, the goal of being noticed. I then started to imagine how desperate they must feel when the night approaches because they know they are far less likely to be seen or even searched for.

Then the method came to mind, use different colored lights to distinguish between children, elderly, disabled, adults and pets. With the technology of the present Application having an illuminated display system having an illuminated display, the illuminated display system provides at least one method for identifying disaster survivors. Accordingly, these methods for identifying disaster survivors capitalize on the notion that some of today's battery powered illuminated displays can last over a week consistently on and close to two weeks when set to a flashing selection, using one battery. Many offer different colors and flash patterns. Some are very durable and weather resistant. Even today's cell phones and computer screens nave the capability of having different colored screens.

SUMMARY OF THE INVENTION

The method of utilizing an illuminated display to locate and identify people or pets in the aftermath of disaster is implemented in the following exemplary manner, among others. First, an alert is issued by Local, State or Federal agency indicating a disaster is approaching or has occurred. For example a hurricane warning, a tsunami warning, a tornado warning, etc. . . . The population found in the area that is effected then starts to prepare for the oncoming devastation with the forewarned disaster to arrive. Unlike other known methods, the present invention provides for part of that preparation includes utilizing an illuminated display by each member of the family. Children are identified by solid red, elderly/disabled are identified by solid green, adults are identified by solid blue and pets are identified by yellow prior to or soon after a disaster has stricken. Once the disaster has passed and the person wearing the illuminated display has survived, the living then change their illuminated solid color to a flashing color to indicate they are in need of medical or other type of assistance. Those caught without the capability to signal using colors could use their flashlights and other white light emitting products to participate by using white as their identifier to convey general population.

In at least one illustration, under the present method, first responders now patrol the designated disaster area from high ground, ground, or by air to locate and identify children in need of assistance by the flashing red illuminated displays, elderly/disabled in need of assistance by the flashing green illuminated displays, adults in need of assistance by the flashing blue illuminated displays and pets by the solid or flashing yellow illuminate displays. The present method now allows search and rescue for the night. The darkness may now be utilized to aid first responders in locating and identifying survivors, and survivors in need of assistance for up to 2 weeks, for example. Now, under the present method, the 12 hours of the day that are generally dark and not fully utilized in the absence of the present invention are used to gather intelligence as to where people are located. Moreover, under the present method, the makeup of each group located and the request for assistance if needed.

BRIEF DESCRIPTION OF THE DRAWING

FIG. 3 are orthographic views from the top illustrating one exemplary embodiment of an illuminated display system, in particular.

DETAILED DESCRIPTION

Figure 1:
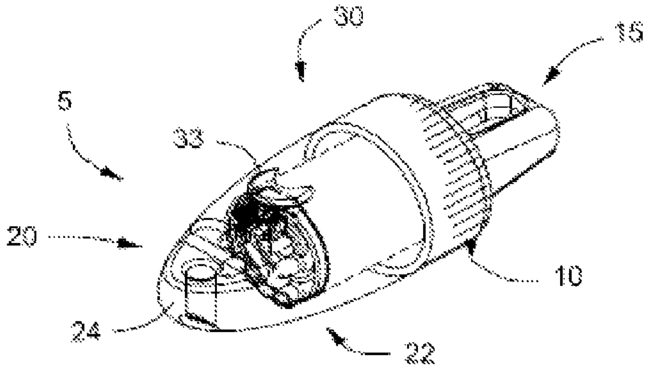
FIG. 1 is an isometric view from the top illustrating an illuminated display system for placement on an user according to the present invention, the illuminated display system includes a plurality of light emitters that individually emit a predetermined wavelength band relating to the users identity (child, elderly, disabled, adult, pet for example) and condition (need of assistance for example)
Figure 2:
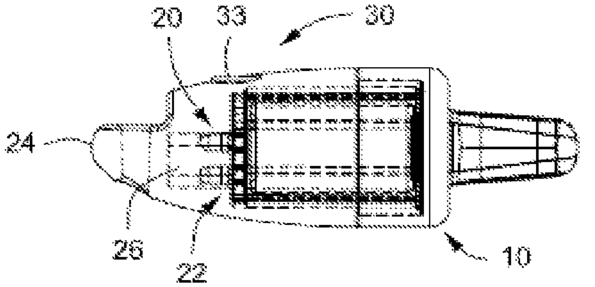
FIG. 2 is an orthographic view from the side illustrating one exemplary embodiment of an illuminated display system.
Figure 3A:
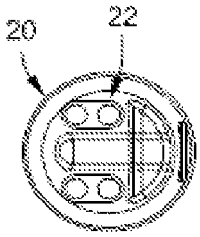
FIG. 3*a* is an orthographic view from the front illustrating a display interface of the illuminated display system.
Figure 3B:
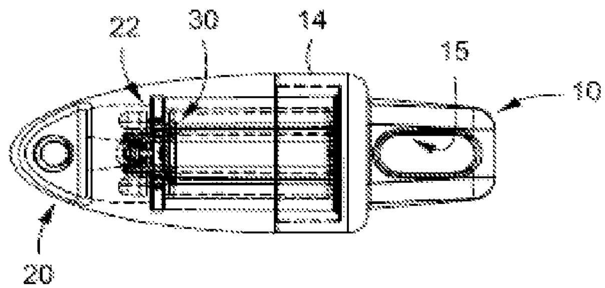
FIG. 3*b* is an orthographic view from the top illustrating an illuminated display system having a fastening interface

Referring to FIG. 1-3, there is shown an illuminated display system 30 for placement on a user according to the present invention. The illuminated display system incorporates four LED's 22, each LED 22 emitting a different wavelength of light, each wavelength of light conveying a different meaning. In at least one illustrative method provided by the present invention, the illuminated display system 30 illuminating the solid red selection indicates a child. A flashing red selection indicates a child in need of assistance. In at least one illustrative method provided by the present invention, the illuminated display system 30 illuminating a solid green selection indicates elderly/disabled. A flashing green indicates an elderly/disabled in need of assistance. Illuminating solid blue selection indicates an adult. A flashing blue indicates an adult in need of assistance. The yellow is an optional selection embodiment and in this embodiment of the invention is used to tag a pet. It would be up to the animal owner to switch the selection on the illuminated display system 30 to flashing to indicate the pet is in need of medical or other type of assistance. The white is an optional selection embodiment and in this embodiment of the invention is used to indicate general population unable to signal using a color system or method. In at least one exemplary embodiment, the flash rate to identify a survivor is in the range between 30 and 300 pulses per minute. Moreover, one exemplary embodiment of an illuminated display, of an illuminated display system 30, includes a lock feature that prevents the illuminated display from being inadvertently switched or turned off.

Figure 4:
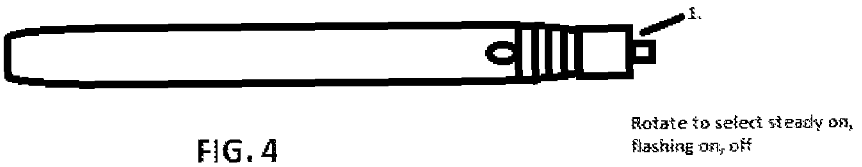
FIG. 4 is a drawing of a single colored, multimode illuminated device using a rotary switch to select the appropriate mode provided by at least one method of the present invention of steady continuous light or flashing light.

Referring to FIG. 4 there is shown an illuminated display system 30 having illuminated single colored, multimode light 22 for placement on a user according to the present invention. The illuminated single colored, multi-mode light can be activated by rotating a switch 1 to the solid on selection and rotating it further to the flashing selection.

Figure 5:
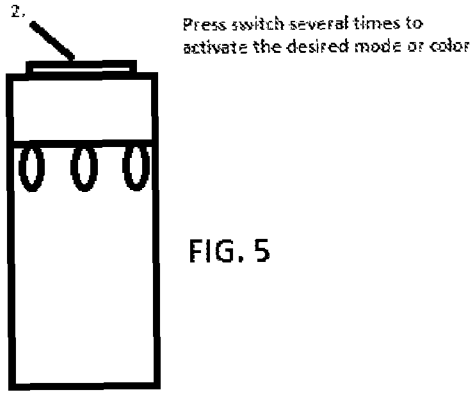
FIG. 5 is a drawing of a single colored, multimode illuminated device using a pushbutton switch to select the appropriate mode provided by at least one method of the present invention of steady continuous light or flashing light.

Referring to FIG. 5 there is shown an illuminated display system 30 having single colored, multimode light for placement on a user according to the present invention. Illustratively, the illuminated display is attached to the person by being held in the hand. The illuminated single colored, multimode light is activated by pressing a switch 2 to get to the desired mode selection, off, on, flashing, etc. . . .

The illuminated, single colored, multimode light may also contain whistles, mirrors and other signaling methods attached or designed into the illuminated display. In one exemplary embodiment, the illuminated display is water resistant and/or waterproof.

Figure 6:
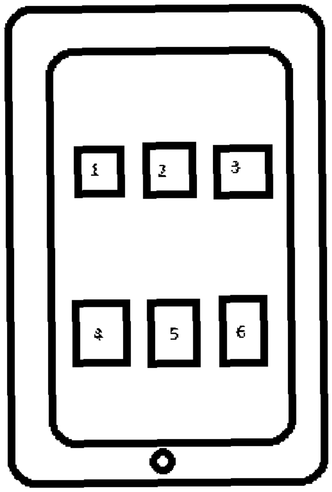
FIG. 6 is a drawing of a mobile device screen utilizing an application to implement the illuminated display personal disaster identification method by changing the screen color to the appropriate color and mode provided by at least one method of the present invention for the circumstance.

Referring to FIG. 6 there is shown a mobile device utilizing a mobile application to utilize the method in case there is no time to go home and prepare, close to 90% of adults carry mobile devices. In at least one exemplary embodiment, the illuminated display is a smart phone or computer screen. Accordingly, mobile device user selects the application and is given the choice of selecting 1. Child (red), 2. disabled/elderly (green), 3. adults (blue), 4. child in need of assistance (flashing red), 5. disabled/elderly in need of assistance (flashing green) and 6. adults in need of assistance (flashing blue). Once selected by the mobile device user, the mobile device displays the corresponding illuminated screen color and mode.

Figure 7:
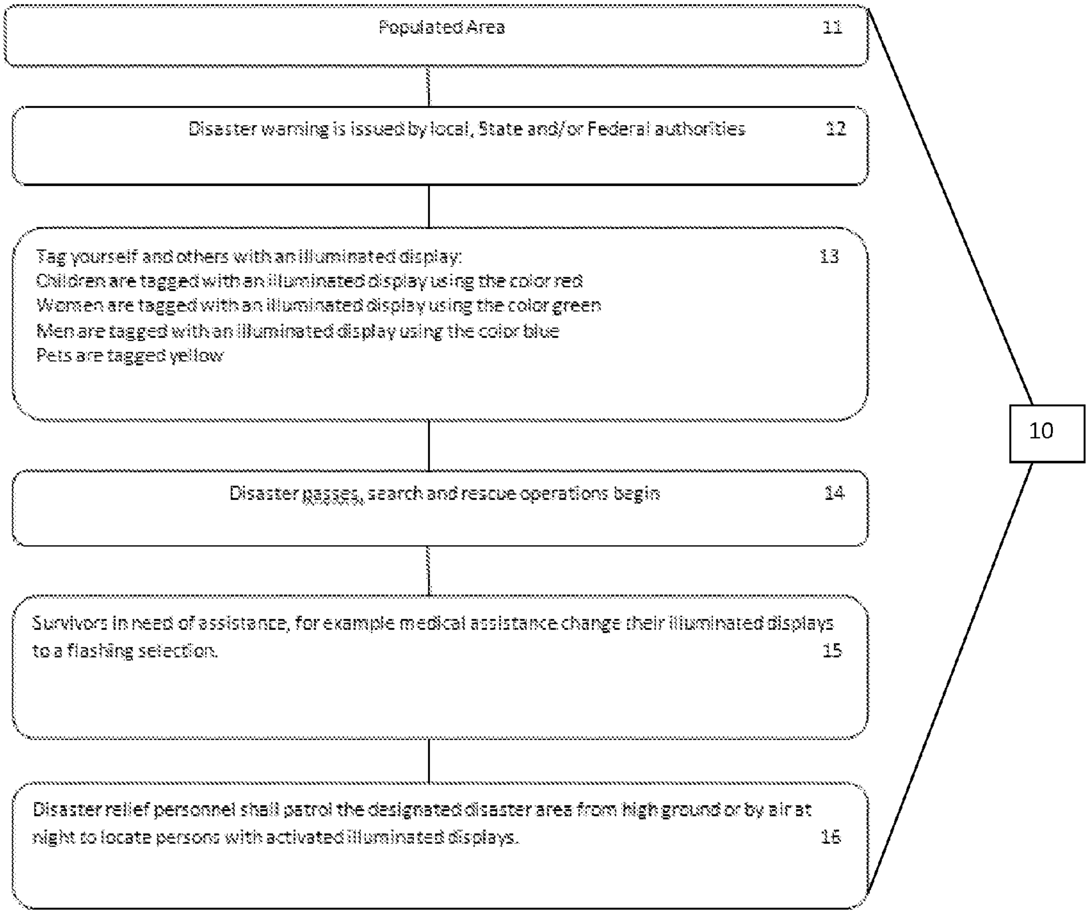
FIG. 7 is a diagram one illustrative embodiment of the personal disaster identification method

Referring at least to FIG. 7, one exemplary embodiment of a method 10 for utilizing a disaster identification system utilizing illuminated displays may be appreciated as follows. You begin with a population 11 that is soon to be or has been struck by a disaster. Disaster alert 12 is issued and the population 11 gets prepared. Part of that preparation includes the tagging of each family member with an illuminated display 13. Children are tagged solid red prior to or soon after the disaster strikes. Elderly/disabled are tagged solid green prior to or soon after the disaster strikes. Adults are tagged solid blue prior to or soon after a disaster strikes and pets are tagged yellow. Illustratively, in one exemplary embodiment, the lighting operation sequence includes the step of identifying post disaster survivor children with a red illuminated display, and post disaster elderly/disabled with green illuminated display, and post disaster adults with a blue illuminated display. In an alternative embodiment, the lighting operation sequence includes the step of identifying survivor children in need of assistance with flashing red illuminated displays, post disaster survivor elderly/disabled in need of assistance with a flashing green illuminated display and post disaster survivor adults in need of assistance with a flashing blue illuminated display. Optionally, in an alternative embodiment, the lighting operation sequence includes the step of identifying pets with a yellow illuminated display. Optionally, in an alternative embodiment, the lighting operation sequence includes the step of identifying survivors caught without color signaling capability with a white illuminated display. By switching 15 to the flashing selection the illuminated display user has accomplished two things. First the battery life is now extended and will allow the illuminated displays to illuminate brighter and longer. Second it will allow first responders to distinguish between survivors with no need of medical or other type of assistance and survivors in need of medical or other type of assistance thus allowing them to focus search and rescue efforts on the people in most need of assistance (flashing) and at the same time flag or mark where non flashing illuminated displays are located. In at least one aspect the people who did survive and are not able to change the color selection from solid to flashing could move the illuminated display to show movement and therefore signal they are in need of assistance and are alive. In one exemplary embodiment, the illuminated display includes a memory recall and return to the selected color even after power has been lost to the illuminated display system due to adverse conditions found during a disaster. First responders can now utilize the illuminated displays to gather intelligence and better preplan 16 first light rescue operations thus reducing the time and costs associated with these endeavors, besides increasing the efficiency of the Search and Rescue teams.

Although the present invention has been described in detail, it should be understood that various changes, substitutions, and alterations could be made hereto without departing from the spirit and scope of the invention as defined by the appended claims.

I claim:

1. A method for visually identifying, distinguishing, and tracking a plurality of disaster user victims comprising the steps of:

utilizing an illuminated display system, the illuminated display system including an illuminated display and a processor communicatively connected to the illuminated display, the illuminated display providing different wavelengths of light by emissions controlled by the processor therefrom, each respective wavelength of light providing information relating to a corresponding status of each disaster user victim;

providing a lighting operation sequence, the lighting operation sequence comprises an application function executed by the processor for emitting wavelengths of light from the illuminated display;

issuing a trigger, the trigger engages the lighting operation sequence for each illuminated display utilized by a corresponding disaster user victim of the plurality of disaster user victims;

identifying, via the lighting operation sequence, disaster user victims from emissions of predetermined wavelengths of light that correspond to children, elderly, disabled, and adults;

distinguishing, via the lighting operation sequence, disaster user victims from emissions of predetermined wavelengths of light that correspond to not injured or need assistance status; and tracking, via the lighting operation sequence, user victims over a predetermined period by which corresponding predetermined wavelengths of light are emitted.

2. The method according to claim 1 wherein the step of identifying disaster user victims from emissions of predetermined wavelengths of light that correspond to children, elderly, disabled, adults and general population further includes the step of assigning a predetermined blue wavelength of light to correspond to adults, a predetermined green wavelength of light to correspond to elderly/disabled, a predetermined red wavelength of light to correspond to children, and a predetermined white wavelength of light to correspond to the general population.

3. The method according to claim 1 further comprising the step of identifying disaster user victims from emissions of predetermined wavelengths of light that correspond to animals.

4. The method according to claim 1 wherein the step of identifying disaster user victims from emissions of predetermined wavelengths of light that correspond to animals further includes the step of assigning a predetermined yellow wavelength of light to correspond to animals.

5. The method according to claim 1 wherein the trigger comprises issuing a disaster declaration.

6. The method according to claim 5 wherein the step of tracking a plurality of disaster user victims further includes the step of continuously emitting at least one light wavelength from each illuminated display after a disaster strikes.

7. The method according to claim 5 wherein the step of tracking a plurality of disaster user victims further includes the step of intermittently emitting at least one light wavelength from each illuminated display after a disaster strikes.

8. The method according to claim 1 wherein the trigger comprises issuing an alert.

9. The method according to claim 1 wherein the illuminated display further includes a switch, the switch coupled to the illuminated display.

10. The method according to claim 9 wherein the lighting operation sequence further includes the step of a disaster user victim toggling between injured and non-injured via the switch.

11. The method according to claim 9 wherein the lighting operation sequence further includes the step of one disaster user victim selecting corresponding illumination status of either child, elderly, disabled, or adult via the switch.

12. A system for visually identifying, distinguishing, and tracking a plurality of disaster user victims, comprising:

an illuminated display system, the illuminated display system including an illuminated display and a processor communicatively connected to the illuminated display, the illuminated display coupled to each disaster user victim of the plurality of disaster user victims, the illuminated display providing different wavelengths of light by emissions controlled by the processor therefrom, each respective wavelength of light providing information relating to a corresponding status of each disaster user victim;

a lighting operation sequence, the lighting operation sequence comprises an application function executed by the processor for emitting wavelengths of light from the illuminated display, the lighting operation sequence includes the step of identifying disaster user victims from emissions of predetermined wavelengths of light that correspond to children, elderly, disabled, and adults, the further step of distinguishing disaster user victims from emissions of predetermined wavelengths of light that correspond to alive/not injured, and alive but need assistance, and the further step of tracking user victims over a predetermined period by which predetermined wavelengths of light are emitted; and a trigger, the trigger engages the lighting operation sequence for each illuminated display utilized by the plurality of disaster victims.

13. The system according to claim 12 wherein the step of identifying disaster user victims from emissions of predetermined wavelengths of light that correspond to children, elderly, disabled, adults and general population includes the step of assigning a predetermined blue wavelength of light to correspond to adults, a predetermined green wavelength of light to correspond to elderly/disabled, a predetermined red wavelength of light to correspond to children, and a predetermined white wavelength of light to correspond to general population.

14. The system according to claim 12 wherein the trigger comprises issuing a disaster declaration.

15. The system according to claim 14 wherein the step of tracking a plurality of disaster user victims further includes the step of continuously emitting at least one light wavelength from each illuminated display after a disaster strikes.

16. The system according to claim 14 wherein the step of tracking a plurality of disaster user victims further includes the step of intermittently emitting at least one light wavelength from each illuminated display after a disaster strikes.

17. The system according to claim 12 wherein the trigger comprises issuing an alert.

18. The system according to claim 12 wherein the illuminated display further includes a switch, the switch coupled to the illuminated display.

19. A method for visually identifying, distinguishing, and tracking a plurality of disaster user victims comprising the steps of:

utilizing an illuminated display system, the illuminated display system including an illuminated display and a processor communicatively connected to the illuminated display, the illuminated display providing different wavelengths of light by emissions controlled by the processor therefrom, each respective wavelength of light providing information relating to a corresponding status of each disaster user victim;

providing a lighting operation sequence, the lighting operation sequence comprises an application function executed by the processor for emitting wavelengths of light from the illuminated display;

issuing a trigger, the trigger engages the lighting operation sequence for each illuminated display utilized by the plurality of disaster victims;

identifying, via the lighting operation sequence, disaster user victims from emissions of predetermined wavelengths of light that correspond to children, elderly, disabled, adults and general population;

distinguishing, via the lighting operation sequence, disaster user victims from emissions of predetermined wavelengths of light that correspond to alive/not injured, and alive but need assistance; and tracking, via the lighting operation sequence, user victims over a predetermined period by which predetermined wavelengths of light are emitted.

20. The method according to claim 19 wherein the illuminated display further includes a switch, the switch coupled to the illuminated display, and further comprising the step of toggling, via the disaster user victim, between injured and non-injured with the switch.

* * * * *